US012728425B2

(12) United States Patent
Hasegawa et al.

(10) Patent No.: US 12,728,425 B2
(45) Date of Patent: Sep. 8, 2026

(54) ELECTRIC PRECIPITATOR FOR PRESS MOLD AND PRESS MOLD USING SAME

(71) Applicant: CREATIVE TECHNOLOGY CORPORATION, Kawasaki (JP)

(72) Inventors: Takaaki Hasegawa, Kawasaki (JP); Hiroyuki Moriyama, Kawasaki (JP); Daisuke Horiuchi, Toyota (JP); Yoshiki Oshima, Toyota (JP); Tadayuki Morishita, Toyota (JP); Yoshihiro Nagano, Toyota (JP); Tomio Waseda, Toyota (JP); Manabu Tomiya, Toyota (JP)

(73) Assignee: CREATIVE TECHNOLOGY CORPORATION, Kawasaki (JP)

( * ) Notice: Subject to any disclaimer, the term of this patent is extended or adjusted under 35 U.S.C. 154(b) by 348 days.

(21) Appl. No.: 18/690,336

(22) PCT Filed: Oct. 4, 2022

(86) PCT No.: PCT/JP2022/037126
§ 371 (c)(1),
(2) Date: Mar. 8, 2024

(87) PCT Pub. No.: WO2023/058651
PCT Pub. Date: Apr. 13, 2023

(65) Prior Publication Data

US 2024/0375121 A1 Nov. 14, 2024

(30) Foreign Application Priority Data

Oct. 6, 2021 (JP) ................................ 2021-164770

(51) Int. Cl.
*B01D 53/02* (2006.01)
*B03C 3/47* (2006.01)
(Continued)

(52) U.S. Cl.
CPC ................. *B03C 3/64* (2013.01); *B03C 3/47* (2013.01); *B03C 3/70* (2013.01); *B03C 3/86* (2013.01); *B21D 55/00* (2013.01)

(58) Field of Classification Search
CPC .. B03C 3/017; B03C 3/47; B03C 3/64; B03C 3/68; B03C 3/70; B03C 3/86; B21D 55/00
See application file for complete search history.

(56) References Cited

U.S. PATENT DOCUMENTS

2006/0172639 A1* 8/2006 Yamada ............ B01D 39/2017
442/59
2007/0148061 A1* 6/2007 Lau .......................... B03C 3/32
422/186.04
(Continued)

FOREIGN PATENT DOCUMENTS

CN 205462735 U 8/2016
CN 214133770 U 9/2021
(Continued)

OTHER PUBLICATIONS

International Search Report (PCT/ISA/210), issued in PCT/JP2022/037126, dated Nov. 8, 2022.
(Continued)

*Primary Examiner* — Christopher P Jones
(74) *Attorney, Agent, or Firm* — Birch, Stewart, Kolasch & Birch, LLP

(57) ABSTRACT

To provide an electric precipitator for a press mold, which can collect more reliably dusty foreign matter emitted during stamping process utilizing an electrostatic force, has excellent installability, and can be used safely. Provided is an electric precipitator for a press mold, the electric precipitator being used together with the press mold to collect dusty foreign matter emitted during stamping process by an electrostatic force and including: a laminated sheet in which a
(Continued)

dust collection layer that holds the dusty foreign matter in contact, a first electrode layer, a second electrode layer, an insulation layer, and a close-contact fixation layer for installation on and fixation to a mold to be used are laminated; and a power supply device that applies voltages across the first and second electrode layers. The insulation layer at least has a first insulation layer that insulates the dust collection layer and the first electrode layer, a second insulation layer that insulates the first electrode layer and the second electrode layer, and a third insulation layer that insulates the second electrode layer and the close-contact fixation layer. The first and second electrode layers are films obtained by coating a polyethylene terephthalate (PET) base material with a conductive polymer and having a surface resistivity of $10^4$ to $10^5$ Ω. A polyimide film having a base material thickness of 75 μm is used for the second insulation layer. A press mold including the same is also provided.

6 Claims, 3 Drawing Sheets

(51) Int. Cl.

| | |
|---|---|
| ***B03C 3/64*** | (2006.01) |
| ***B03C 3/70*** | (2006.01) |
| ***B03C 3/86*** | (2006.01) |
| ***B21D 55/00*** | (2006.01) |

(56) References Cited

U.S. PATENT DOCUMENTS

| | | | | |
|---|---|---|---|---|
| 2007/0223173 | A1 | 9/2007 | Fujisawa et al. | |
| 2009/0030134 | A1* | 1/2009 | Sasaki | C03C 11/002 423/337 |
| 2009/0040681 | A1 | 2/2009 | Fujisawa et al. | |
| 2012/0120545 | A1 | 5/2012 | Fujisawa et al. | |
| 2016/0207051 | A1 | 7/2016 | Tatsumi et al. | |
| 2022/0355311 | A1* | 11/2022 | Kawada | B33Y 30/00 |
| 2024/0399388 | A1* | 12/2024 | Hasegawa | B03C 3/68 |
| 2025/0176096 | A1* | 5/2025 | Zhang | B03C 3/49 |

FOREIGN PATENT DOCUMENTS

| | | | |
|---|---|---|---|
| EP | 1 909 308 | A1 | 4/2008 |
| JP | 2004-291012 | A | 10/2004 |
| JP | 2005-64105 | A | 3/2005 |
| WO | WO 2005/091356 | A1 | 9/2005 |
| WO | WO 2007/066572 | A1 | 6/2007 |
| WO | WO 2015/029698 | A1 | 3/2015 |

OTHER PUBLICATIONS

Written Opinion of the International Searching Authority (PCT/ISA/237), issued in PCT/JP2022/037126, dated Nov. 8, 2022.

* cited by examiner ( i )

( i i )

ELECTRIC PRECIPITATOR FOR PRESS MOLD AND PRESS MOLD USING SAME

TECHNICAL FIELD

This invention relates to an electric precipitator that can collect dust such as fine particles and small swarf/chips utilizing an electrostatic force, the dust being emitted during the stamping process using a press mold, and also relates to a press mold using the same.

BACKGROUND ART

When an article to be processed (workpiece) is punched with a mold during stamping process, dusty foreign matter such as fine particles and small swarf/chips is emitted due to, for example, friction between the punched workpiece and the mold. There is a concern that the emitted dusty foreign matter will flows onto a workpiece surface because of negative pressure when the mold is opened/closed, and furthermore, that fine particles will remain floating in the air for a long time and naturally drop to adhere onto the workpiece, thus causing product failures such as dents, hollows, and scratches during drawing and bending.

Therefore, in order to deal with the above-described failures resulting from such dusty foreign matter, methods such as attraction with magnets in a case where the dusty foreign matter is magnetic metal or removal by air suctioning, for example, have been conventionally employed.

However, the effect of application of a magnet is limitedly applicable to magnetic materials and is therefore ineffective for dusty foreign matter composed of non-magnetic metals or other materials. On the other hand, because of the characteristics of a forming press, a mold is in a sealed state in the instant of punching when most of the fine particles are emitted, and the pressure is negative when the mold is opened. Thus, in such a case, suctioning by air cannot be expected to exert a sufficient effect, and indeed is less effective for dust collection.

On the other hand, a method for blowing air onto dusty foreign matter to remove the dusty foreign matter by a blowing effect has also been conventionally used. Patent Literature 1, for example, proposes, in a pressing apparatus according to a technology antecedent thereto, a method such as effectively supplying compressed gas directed toward a predetermined site in order to more effectively remove dusty foreign matter accumulated between a lower mold and a knockout. Although this is relatively effective at blowing away large foreign matter, such a method by blowing air might adversely blow up and disperse fine dusty foreign matter such as fine particles in the air and therefore has a limited effect in terms of preventing adhesion to a workpiece considering fine dusty foreign matter such as fine particles as well.

Besides, a method through use of an air purifier of a filter type, an electric precipitation type, or the like, which is generally used to deal with foreign matter, requires a certain degree of size to be ensured because of the configuration of the air purifier. It is therefore difficult to install the air purifier in the inside of or in the vicinity of a mold which has a limited space and particularly in the vicinity of a punching blade where a large amount of dusty foreign matter is emitted, and when installed outside the mold, a sufficient effect of collecting particles (dusty foreign matter) emitted inside the mold cannot be expected. In addition, even if an airflow path from the outside of the mold to a place inside the mold where dust is emitted is provided to collect dust, the method through use of an air purifier turns out to be similar to the above-described air suctioning and is less effective in dust collection.

In the meanwhile, as a method for attracting particles (dusty foreign matter) and collecting dust in question in a procedure of manufacturing semiconductor and liquid crystal displays, a method for collecting dust using a coulomb-type electrostatic chuck as described in Patent Literature 2, for example, has been conventionally proposed. Such a method does not have the disadvantages of the method through use of magnets and the method through use of air as described above, and enables collection of foreign matter utilizing static electricity. In such a coulomb-type electrostatic chuck in which electrodes are aligned in the horizontal direction and an electric field is thus produced in a gap between the electrodes, however, lines of electric force concentrate in the horizontal direction, and the electric field hardly spreads in the vertical direction. Therefore, such a method has little effect on attracting relatively fine dusty foreign matter such as floating fine particles, resulting in a limited effect, although the method is advantageous in terms of the effect of attracting foreign matter coming into contact with the electrodes. Moreover, since the electrodes are installed in a manner exposed to the surface in the actual method in Patent Literature 2, a method through use of a device/instrument employing this kind of configuration might cause spark discharge leading to fire in a case where a dielectric layer is broken, for example, which is problematic in terms of safety, and is therefore unsuitable for use in a mold device.

In addition, among electrostatic chucks, what is called a gradient-force producing type electrostatic chuck employing a configuration in which a plurality of electrode layers is laminated in the depth direction with an interelectrode insulation layer interposed therebetween in order to enhance forces for attracting and holding a target object has also been conventionally proposed (see Patent Literature 3 and Patent Literature 4, for example). Even in a case of utilizing such a gradient-force producing type electrostatic chuck, a good conductive material such as metal is generally used for electrodes to be used for efficient and prompt attraction or responding to dechucking in a conventional electrostatic chuck. However, there are concerns that a conventional electrostatic chuck in which such electrodes are used has the following problems. That is, when voltages are applied across electrode layers, an interelectrode insulation layer comes to act as a capacitor, and power storage occurs. Then, in a case where insulation between the electrodes is impaired by a scratch or the like, for example, in a power stored state, electric energy stored in the capacitor (insulation layer) discharges. This might cause processing oil or machine oil used to catch fire and cause a fire disaster particularly in such a situation in which the electrostatic chuck is used in a place inside a mold or might strongly affect a human body in a case of electric shock.

Consequently, use of the configuration of a conventional electrostatic chuck directly for an electric precipitator for a press mold device has not been considered.

CITATION LIST

Patent Literature

Patent Literature 1: JP2004-291012 A
Patent Literature 2: WO2015/029698 A
Patent Literature 3: WO2005/091356 A
Patent Literature 4: WO2007/066572 A

SUMMARY OF INVENTION

Technical Problem

Thus, the inventors of the present application have earnestly studied such an electric precipitator for a press mold which does not have the disadvantages of the conventional methods through use of a magnet or air, can more reliably collect even fine particles and fine particles of non-magnetic metal or the like, has excellent installability, and furthermore presents no danger such as ignition or a fire disaster. As a result, the inventors have found that the electric precipitator for a press mold can be accomplished particularly by using electrodes obtained by coating a PET base material with a conductive polymer and having a predetermined surface resistivity value while employing what is called the gradient-force producing type electrostatic chuck structure in which a plurality of electrode layers is laminated in the depth direction with an interelectrode insulation layer interposed therebetween, and have thereby completed the present invention.

The present invention therefore has an object to provide an electric precipitator for a press mold which enables dusty foreign matter emitted during stamping process to be collected more reliably utilizing an electrostatic force and can be used safely in a press mold device, and to provide a press mold using the same.

Solution to Problem

In other words, the following describes a summary of the present invention.

[1] An electric precipitator for a press mold, the electric precipitator being used together with the press mold to collect dusty foreign matter emitted during stamping process by an electrostatic force and including:

a laminated sheet in which a dust collection layer that holds the dusty foreign matter in contact, a first electrode layer, a second electrode layer, an insulation layer, and a close-contact fixation layer for installation on and fixation to a mold to be used are laminated; and a power supply device that applies voltages across the first and second electrode layers, in which the insulation layer at least has a first insulation layer that insulates the dust collection layer and the first electrode layer, a second insulation layer that insulates the first electrode layer and the second electrode layer, and a third insulation layer that insulates the second electrode layer and the close-contact fixation layer, the first and second electrode layers are films obtained by coating a polyethylene terephthalate (PET) base material with a conductive polymer and having a surface resistivity of $10^4$ to $10^5$ Ω, and a polyimide film having a base material thickness of 75 μm is used for the second insulation layer.

[2] The electric precipitator for a press mold according to [1], in which the first electrode layer has a plurality of lost portions extending through in a thickness direction of the first electrode layer, the lost portions have an area ratio of 10% to 20% of a total area of the first electrode layer, and the first electrode layer including the lost portions is larger in top view than the second electrode layer by 4.2 to 6.2 mm at an end, and the first and second electrode layers are laminated with an interposition of the second insulation layer in a thickness direction of the laminated sheet.

[3] The electric precipitator for a press mold according to [1] or [2], in which during use, the electric precipitator is used with a negative voltage applied to the first electrode layer and a positive voltage applied to the second electrode layer, and the voltage applied to the first electrode layer is 4 to 5 kilovolts (kV), and the voltage applied to the second electrode layer is 2 kilovolts (kV).

[4] The electric precipitator for a press mold according to any one of [1] to [3], in which the close-contact fixation layer includes a neodymium magnet sheet.

[5] The electric precipitator for a press mold according to any one of [1] to [4], in which a silicone resin sheet is used for the dust collection layer.

[6] A press mold, in which the electric precipitator for a press mold according to any one of [1] to [5] is used.

Advantageous Effects of Invention

According to the present invention, an electric precipitator for a press mold which enables fine particles and fine particles of non-magnetic metal or the like as dusty foreign matter emitted during stamping process to be collected more reliably utilizing an electrostatic force, has excellent installability, and can be used safely in a press mold device, can be provided.

DESCRIPTION OF EMBODIMENT

Figure 1:
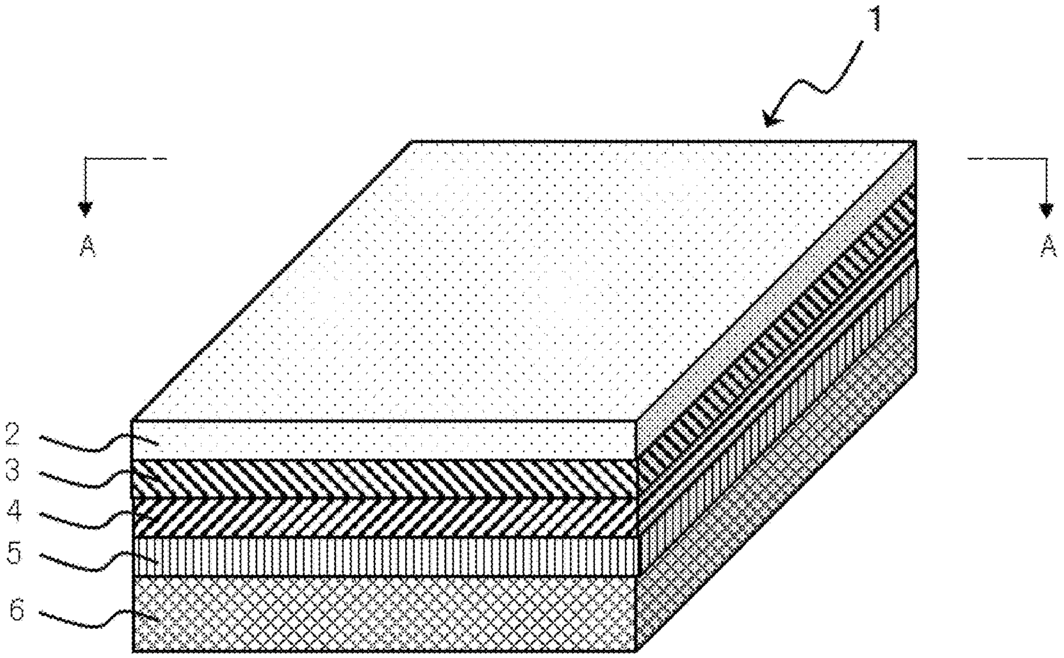
FIG. 1 shows an example of an electric precipitator of the present invention, (i) showing an external perspective view and (ii) showing a cross-sectional explanatory diagram, which is part of a cross-section along line A-A in (i).
Figure 1:
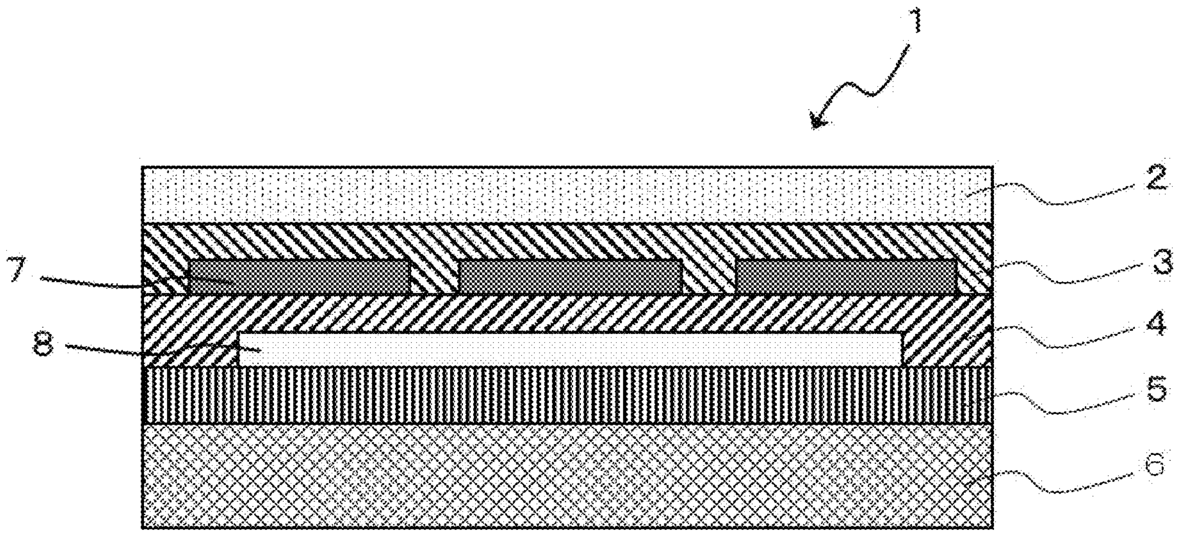

Hereinafter, the present invention will be described in detail with reference to the drawings according to necessity. Numbers represent reference characters in the drawings in some cases.

An electric precipitator for a press mold of the present invention includes a laminated sheet 1 in which at least a dust collection layer 2, a first electrode layer 7, a second electrode layer 8, insulation layers 3 to 5, and a close-contact fixation layer 6 for installation on and fixation to a mold to be used are laminated as shown in FIG. 1 (note that the laminated sheet 1 will be described without differentiation from the electric precipitator in some cases). The insulation layers at least have the first insulation layer 3 that insulates the dust collection layer and the first electrode layer, the second insulation layer 4 that insulates the first electrode layer and the second electrode layer, and the third insulation layer 5 that insulates the second electrode layer and the close-contact fixation layer as shown in the drawing. The electric precipitator further includes a power supply device (not shown) that applies voltages across the first electrode layer and the second electrode layer.

<Electrode Layers>

The electrode layers to be used in the present invention at least include the first electrode layer 7 and the second electrode layer 8 as described above, and preferably, a structure in which they are laminated with an insulation layer (the second insulation layer) interposed therebetween in a thickness direction of the laminated sheet should be employed. Employment of such a laminated structure enables integration of the dust collection structure unlike conventional electric precipitators and brings an advantage in that the thickness can be reduced. Then, a film obtained by coating a polyethylene terephthalate (PET) base material as a support base material with a conductive polymer and having a surface resistivity of $10^4$ to $10^5$ Ω, preferably $10^4$ Ω, is used as the electrode layers of the present invention. Since the electrode layers have such a surface resistivity, the amount of current is reduced, and power storage in the insulation layer (capacitor) significantly decreases. In addition, even in a case in which insulation is impaired by breakage of the insulation layer or the like, stored energy will pass through the surface of an electrode layer, which is a resistor, when flowing into a broken part, which can significantly lower the electric energy, enabling the risk of fire catching, an impact on human bodies, and the like to be reduced.

Herein, the use of PET as the support base material makes it less likely to cause a crack during punching or cutting, which is preferable in terms of processability. In addition, any conductive polymer that comes to have a surface resistivity value as described above can be employed as appropriate. Preferable examples can include polypyrrole-based, polyacetylene-based, polythiophene-based, polyaniline-based, and other polymers. Among them, more preferably, a polypyrrole-based or polythiophene-based polymers should be used in terms of stability. Furthermore, a coating target is not limited to only the conductive polymers described above as long as it comes to have a surface resistivity value as described above. As long as it has at least the conductive polymer described above, a form of a paint composition containing a pigment, an organic dye, or the like as commonly used in a paint together with the conductive polymer may be adopted. Note that a common coating method through use of a paint or the like can be employed as a coating method.

Specific examples of such electrode layers of the present invention obtained by coating a PET base material with a conductive polymer can include Staclear NAS (the name of product) manufactured by Nagaoka Sangyou Co., Ltd., DAICREA (the name of product) of DAINIHON PACKAGE CORPORATION, and the like. In addition, ST-poly (the name of product) manufactured by ACHILLES CORPORATION or the like can be used as the conductive polymer.

The thickness of each of the electrode layers of the present invention having such a configuration may be adjusted as appropriate taking into account the overall configuration of the electric precipitator, applied voltages, a usage environment, and the like, and for maintaining flexibility of the laminate, 1 to 200 μm is preferable, and more preferably, 25 to 100 μm should be adopted.

Furthermore, for the shape of the electrode layers of the present invention, a configuration of a conventional electrostatic chuck having an equivalent structure can be employed as appropriate. For example, each of the electrode layers may be formed into a shape such as a flat-plate shape, a semi-circular shape, a comb-teeth shape, or a mesh shape having a plurality of lost portions (openings) extending through in the thickness direction of the electrode layer in a predetermined region. Note that the above-described lost portions may be circular or polygonal.

Figure 2:
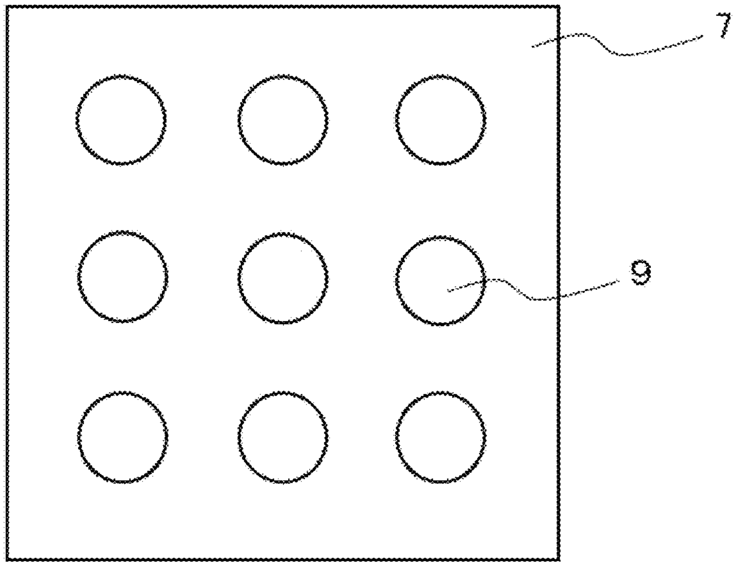
FIG. 2 is a plan view showing an example of a first electrode layer.

Among such shapes of the electrode layers, preferably, the shape of the first electrode layer 7 arranged in an upper part should be formed into a mesh-shaped electrode layer having a plurality of the above-described lost portions (openings; reference numeral 9) as shown in FIG. 2, and on the other hand, the shape of the second electrode layer 8 arranged below the first electrode layer should be formed into a flat-plate shape. At least such a combination of the shapes of the first electrode layer and the second electrode layer can moderately increase leakage of electric field from the second electrode layer, which is preferable. In this case, it is more preferable that the first electrode layer should be formed such that the lost portions have an area ratio of 10% to 20% of the total area of the first electrode layer. By adjusting the lost portions to have such an area ratio, a force for gripping collected dusty foreign matter is ensured, and a dust collection distance is maintained, which is preferable. Note that it is desirable that each of the lost portions should have a size of ϕ7, for example, and it is desirable that each of the lost portions should be arranged and formed uniformly in the predetermined region and formed such that energization of the first electrode layer is not interrupted.

Furthermore, it is preferable to form the first electrode layer and the second electrode layer described above such that the total area of the first electrode layer including the above-described lost portions in top view is larger than the area of the second electrode layer, that is, such that the first electrode layer has a size (area) that can cover the second electrode layer. In order to increase the dust collection capability, it is effective to widen a dust collection area. The minimum dimensional difference is desirable. It is more preferable that the first electrode layer should be formed to be larger than the second electrode layer by 4.2 mm from the outermost end, but in a case in which assembly accuracy is taken into account, the range should only be from 4.2 to 6.2 mm. With such a configuration, dusty foreign matter present around the outer periphery of the first electrode layer is collected to a central part while the largest possible dust collection area is ensured in a narrow mold, and at the same time, the dusty foreign matter remains in the first electrode layer, which is preferable. The expression "the outermost end" as used herein shall mean that in a case of assuming that central portions (such as the center or the center of gravity, for example) of the first electrode layer and the second electrode layer are overlapped on each other, a gap on one side (any end) created by the difference in external size in top view falls within the above-described numerical range. In a case of rectangles, squares, or the like, for example, the gap refers to a gap created on each side when they are overlapped such that their centers are overlapped on each other, and in a case of circles, refers to a gap created at the end by the difference in radius. The respective shapes may be different from each other, but the meaning is similar, and it is preferable that at least the difference between ends should have the above-described numerical value.

A potential difference is generated between the first electrode layer and the second electrode layer in the present invention such as by applying voltages of polarities different from each other to them or by grounding one electrode and applying a positive or negative voltage to the remaining electrode, for example. On that occasion, it is preferable that appropriate adjustment should be made depending on a dust collection target object.

<Insulation Layers>

The insulation layers to be used in the present invention at least have the first insulation layer 3, the second insulation layer 4, and the third insulation layer 5 which are predetermined as shown in FIG. 1 and the like, whilst as the material of the insulation layers other than the second insulation layer 4, one or two or more kinds of resins selected from among polyimide, polyamide imide, polyester, polyethylene terephthalate, epoxy, and acrylic resin, for example, are used. Among them, preferably, polyimide should be used from the viewpoints such as insulation properties and chemical resistance. Specifically, a resin film should be used. Examples can include Kapton (the name of product manufactured by DU PONT-TORAY CO., LTD.), UPILEX (the name of product manufactured by Ube Industries, Ltd.), and the like, and Kapton made of polyimide is more preferable.

Herein, in the present invention, it is required to use a polyimide film having a base material having a thickness of 75 μm as the above-described second insulation layer 4. The "base material" as herein referred to refers to a polyimide film itself, and in a case where a plurality of films is laminated, for example, as will be described later, layers for adhesion are not included.

The reasons are as follows: since the electric precipitator of the present invention is used in a manner attached to a press mold, emission of particles due to press-punching and pulling-in of the particles by opening will be continued repeatedly and successively. The maximum effect will be exercised by continuing dust collection all the time while the press mold is in operation. This requires a design to be used with a voltage applied for a long time. In addition, since the electric precipitator is bent and used in a shape in conformity to a mold shape different from product to product, an external stress is an uncertain element. It is therefore preferable that a high factor of safety should be set at least for the second insulation layer, and it is more preferable that the material and thickness should be designed such that the factor of safety is more than or equal to 4 at a withstand voltage of about 30 kV. It is therefore important to use a polyimide film having a base material thickness as described above. Herein, a single film of 75 μm may be used to achieve the base material thickness of 75 μm. Preferably, a plurality of films having a thinner thickness, such as three films of polyimide having a base material thickness of 25 μm, should be used to obtain a total of 75 μm from the viewpoints of flexibility, flex resistance, and the like.

In addition, the configuration of the third insulation layer 5 may be the same as the configuration of the above-described first insulation layer 3 or may be set as appropriate depending on applied voltages, a power supply method, the close-contact fixation layer 6, an adhesive material at the time of assembly, and the like. Preferably, selection or the like should be made as appropriate such that the withstand voltage of the close-contact fixation layer 6 and the third insulation layer 5 together is more than or equal to 10 kV at which the factor of safety is 5 from the viewpoint of dealing with energization of the mold.

<Close-Contact Fixation Layer>

Figure 3:
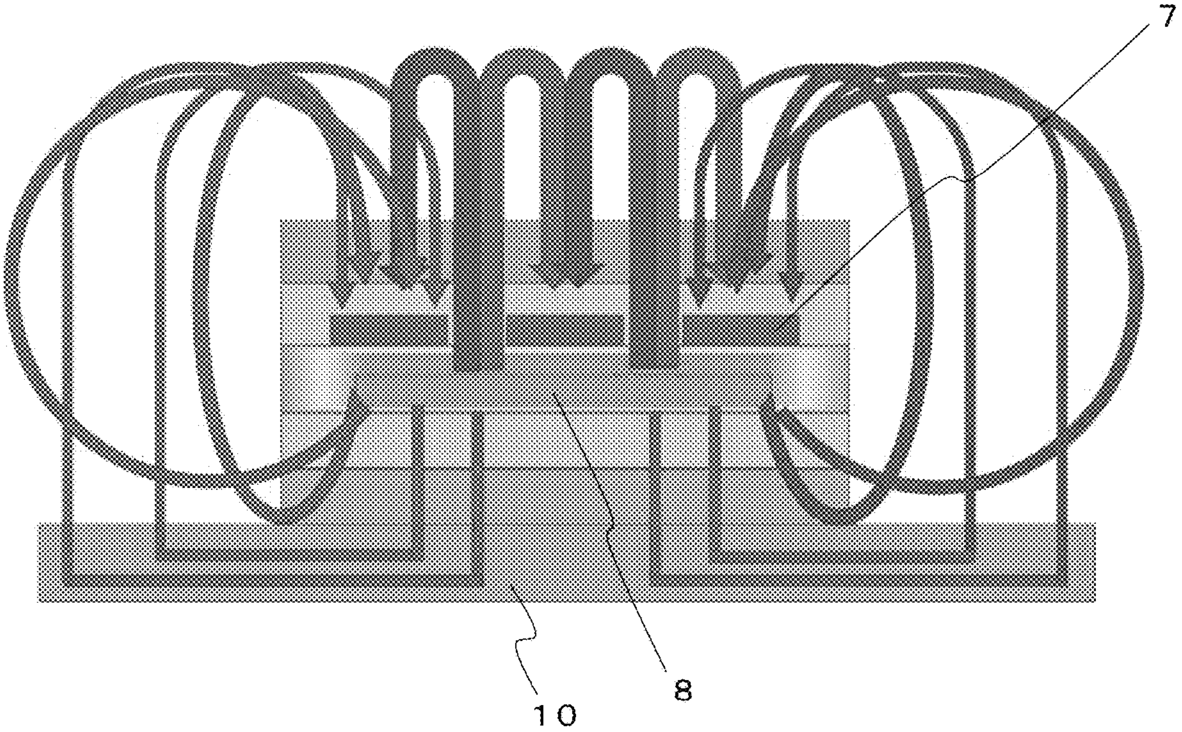
FIG. 3 is a cross-sectional view showing a manner of an electric field produced in the electric precipitator of the present invention.

In the present invention, the close-contact fixation layer 6 is a layer to come into contact with an installation place such as a mold. Particularly in a case where the close-contact fixation layer 6 is installed directly in a mold for which magnetic metal is used as the material of the mold, it is preferable to adopt a layer made of a magnet sheet as the close-contact fixation layer in order to ensure the close contact property with this magnetic metal. Since the electric precipitator in the present invention is intended to be attached to a narrow gap, a neodymium magnet sheet having a strong magnetic force is more preferable. Since the close-contact fixation layer 6 serves to connect the electric field between the second electrode layer 8 and the mold, close contact is important. It is therefore expected that generation of a line of electric force in a lateral direction will be increased and the electric field intensity will be increased by shortening of the line of electric force, enabling a stronger electric field to be generated upward (see FIG. 3 as an example). If close contact is insufficient, dust collection performance is impaired in some cases. The thickness of the close-contact fixation layer 6 can be set as appropriate within a range that does not impair the object of the present invention. Even in a case in which the mold is not made of magnetic metal, close contact with the mold is preferable. In that case, the material and configuration of the close-contact fixation layer can be changed as appropriate in conformity to the material of the mold such that the close contact property can be ensured.

<Dust Collection Layer>

In the present invention, the dust collection layer 2 is a layer with which dusty foreign matter targeted for dust collection is to come into direct contact and serves to assist holding the dusty foreign matter attracted by the electrostatic force. Preferably, a silicone resin sheet should be used as such dust collection layer 2. The silicone resin sheet is preferable because it can be expected to generate an intermolecular force with dusty foreign matter although detailed principles are not certain and because of an excellent maintenance property. Alternatively, more preferably, adhesive means such as an adhesive tape may be provided separately together with the silicone resin sheet from the viewpoint of preventing re-dispersion or the like of the dusty foreign matter due to a reason such as an air pressure associated with lifting and lowering of the mold. Furthermore, a support base material made of resin such as PET resin may be provided together with the silicone resin sheet, the adhesive tape, and the like. It is preferable that the dust collection layer 2 should have a thickness of approximately 0.1 to 0.2 mm.

<Laminated Sheet>

Then, at least the electrode layers, the insulation layers, the close-contact fixation layer, and the dust collection layer having been described so far are used and laminated to obtain the laminated sheet 1 as shown in FIG. 1. The electrode layers are required to be sandwiched between the respective insulation layers such that the electrode layers are not exposed to the outside. Specific methods include a method for sandwiching an electrode between insulation layers and then fusing them under heat and pressure. Alternatively, a bonding sheet, an adhesive agent, or a gluing agent may be used according to necessity to cause the electrode layers and the insulation layers to adhere. Preferably, the layers should be laminated using a silicone-based adhesive agent or the like from a reason such as a low heat resisting temperature of the resin material such as PET to be used for the first electrode layer 7 and the second electrode layer 8.

Herein, as the shape of the laminated sheet 1, the flat-plate shape as shown in FIG. 1, for example, obtained by laminating the above-described materials may be used as it is, or the shape may be partially or entirely changed or processed as appropriate into a shape in conformity to a purpose depending on a usage situation, an installation place, or the like. For example, it is preferable to adopt a flat-plate shape having an entire thickness of approximately 1 mm to 5 mm or a curved surface shape or a three-dimensional shape in conformity to the mold shape such that the laminated sheet 1 can be installed in a press mold or a small space within the device.

<Power Supply Device>

After the laminated sheet 1 is formed as described above, a power supply device for applying voltages to the electrode layers to generate an electrostatic force is required. As the power supply device, one that can be connected to the electrodes of the above-described laminated sheet via connection terminals and a switch (neither shown) and is similar to a generally-used one can be used and should only be capable of producing a direct-current high voltage. A potential difference to be generated can be set at approximately 1 kV to 7 kV. The power supply device may include a step-up circuit (high-voltage generation circuit) that enables stepping up to a required voltage according to necessity. Individual power supplies that generate a positive voltage and a negative voltage may be used in combination.

The laminated sheet 1 and the power supply device as described above are provided to obtain the electric precipitator of the present invention. The electric precipitator of the present invention may be provided separately with a sensor, an ionizing circuit, a cleaning mechanism, and the like according to necessity. Changing, adding, or the like of the configuration, such as changing of the pattern of the electrode layers, for example, may be performed as appropriate within the scope of the object of the present invention.

<Pattern of Usage>

As described above, the electric precipitator of the present invention is used together with a device of a press mold and can collect dusty foreign matter such as fine particles emitted due to, for example, friction between a punched workpiece and a mold, for example, during stamping with the press mold. In order that the dusty foreign matter can be attracted and held more reliably on the above-described dust collection layer 2, it is preferable to adjust voltages (potential difference) to be applied to the above-described electrode layers as appropriate. The reasons are as follows: as in examples which will be described later, the inventors of the present invention presumed that a distance (an attraction distance) by which dusty foreign matter was attracted to the dust collection layer (on the electric precipitator side) substantially depended on the voltages (potential difference) to be applied to the electrode layers, and depending on electric charge and a volume resistivity of the dusty foreign matter, a phenomenon was confirmed in which dusty foreign matter, even if once attracted to the dust collection layer, was repelled without being attracted and held on the dust collection layer due to changes in charging caused by exchange of electric charge with the dust collection layer (on the electric precipitator side), kinetic energy due to an excessive coulomb force, and the like. It has also been found that: an attraction distance of at least 50 mm should only be ensured because the electric precipitator of the present invention adopts the method of use in a manner attached to a gap in the vicinity of a place (dust-emitting part) at which the dusty foreign matter is emitted; it is preferable that the voltage to be applied to the above-described first electrode layer should be adjusted to be more than or equal to −4 kV as understood from Table 3 which will be described later; it is preferable that the potential difference between the first electrode layer and the second electrode layer described above should be small in terms of the relationship between safety and withstand voltage; considering problems such as repelling of dusty foreign matter described above, it is preferable that a negative voltage should be applied to the first electrode layer and a positive voltage should be applied to the second electrode layer; and more preferably, a voltage of −4 kV to −5 kV should be applied to the first electrode layer and a voltage of +2 kV should be applied to the second electrode layer.

Figure 5:
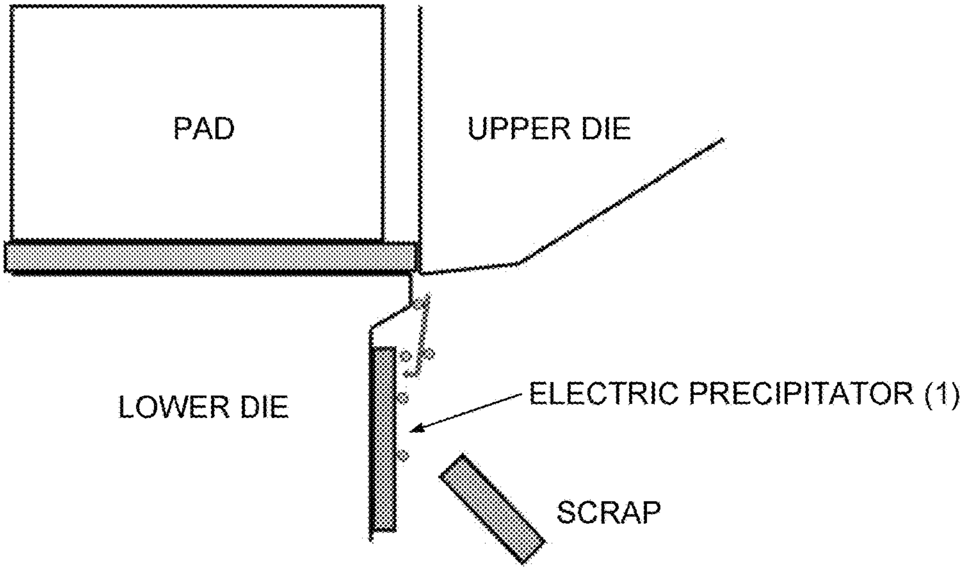
FIG. 5 is a schematic explanatory diagram illustrating how the electric precipitator of the present invention is installed in a press mold (a place in proximity to a material-cutting steel material in a lower die) and evaluated.

Then, the electric precipitator of the present invention should be installed directly on or in the vicinity of a press mold to be used, and it is preferable that the electric precipitator of the present invention should be installed directly on a mold with the above-described close-contact fixation layer interposed therebetween as illustrated in FIG. 5. More preferably, the press mold should have a recessed structure at a position of 4 mm to 5 mm from the end of a lower die, and the electric precipitator should be installed in the recessed structure portion from the viewpoint of collecting scattering chips, whilst the installation position and the like can be selected and adjusted as appropriate within a range not impairing the object of the present invention. Note that as the press mold, every press mold that is used in the present industry and every device using the same can be targeted. The same applies to the material of the mold.

EXAMPLES

Hereinafter, suitable embodiments of the present invention will be described specifically based on examples and comparative examples, but the present invention should not be interpreted in a manner limited by this.

<Evaluation of Attraction Performance of Electric Precipitator>

(1) Loss Rate of First Electrode Layer and CAE Analysis on Attraction Distance

In order to optimize the shape of the first electrode layer, a potential on a perpendicular from the dust collection layer of the electric precipitator and its distance were subjected to an electric field analysis using CAE analysis software (Murata Software Co., Ltd., the name of product: FEMTET) to quantify a space potential during a behavior.

A laminated model having a rectangular plate shape as shown in FIG. 1 was installed in a recess at a position of 5 mm from the end of a lower die of a press mold as shown in FIG. 5 to obtain a model of a pseudo-space in which 50 mm in a mold space between the lower die and an upper die was imitated as air. The analysis was conducted as described in Table 1 applying a potential of −6 kV to the first electrode layer 7 and a potential of 1 kV to the second electrode layer 8 as input values, representing the loss rate by the lost portions (openings; the reference numeral 9) in a first electrode layer model as shown in FIG. 2, and using, as an index, a charging distance at −2 kV as a numerical value close to an actual attraction distance.

As a result, No. 1 to No. 3 satisfied 50 mm filling the mold space, while No. 4 was a shortfall as shown in Table 1.

TABLE 1

| No. | Loss rate of first electrode layer (%) | Charging distance at −2 kV (mm) |
|---|---|---|
| 1 | 10 | >50 |
| 2 | 12 | >50 |
| 3 | 20 | >50 |
| 4 | 25 | 37 |

(2) Difference Between Ends of First and Second Electrode Layers and CAE Analysis on Attraction Distance In order to optimize the shape of the first electrode layer, a potential on a perpendicular from the dust collection layer of the electric precipitator and its distance were subjected to an electric field analysis using CAE analysis software (Murata Software Co., Ltd., the name of product: FEMTET) to quantify a space potential during a behavior.

A laminated model having a rectangular plate shape as shown in FIG. 1 was installed in a recess at a position of 5 mm from the end of a lower die of a press mold as shown in FIG. 5 to obtain a model of a pseudo-space that imitates an atmosphere of 50 mm. The analysis was conducted as described in Table 2 applying a potential of −6 kV to the first electrode layer 7 and a potential of 1 kV to the second electrode layer 8 as input values, representing a distance between the outermost ends of a first electrode layer model and a second electrode layer model as a one-side end difference as shown in FIG. 2, and using, as an index, a charging distance at −2 kV as a numerical value close to an actual attraction distance.

As a result, No. 1 to No. 3 satisfied 50 mm filling the mold space, while No. 4 to No. 6 were shortfalls as shown in Table 2.

TABLE 2

| No. | One-side end difference between first and second electrode layers | Charging distance at −2 kV (mm) |
|---|---|---|
| 1 | 6.2 mm | >50 |
| 2 | 5.2 mm | >50 |
| 3 | 4.2 mm | 50 |
| 4 | 2.0 mm | 26 |
| 5 | 0 mm | 21 |
| 6 | −5.0 mm | 20 |

<Production of Electric Precipitator>

First, an electric precipitator was produced using the respective materials having the shapes as shown in FIG. 1 and laminating them in the order from the upper layer with a laminator. Adhesion of the respective layers was conducted using a silicone-based gluing agent of a polyimide film adhesive tape.

For the dust collection layer 2, a PET film having a thickness of 0.1 mm coated with silicone resin having a thickness of 0.1 mm (manufactured by CREATIVE TECHNOLOGY Co., the name of product: Ionpad) (a total thickness of 0.2 mm) was cut out into a square of 50 mm on one side and used.

In order to ensure an insulation property between the dust collection layer 2 and the first electrode layer 7, a polyimide adhesive tape (Teraoka Seisakusho co., Ltd., the name of product: 760H #25) having a base material thickness of 0.025 mm was cut out into a square of 50 mm on one side and laminated as the first insulation layer 3.

As the material of the first electrode layer 7, a film (DAINIHON PACKAGE CORPORATION, the name of product: DAICREA DC-AN$10^4$) having a thickness of 0.050 mm obtained by coating a PET base material with a conductive paint through use of a polythiophene-based conductive polymer at $1.6\times10^4$ Ω was used. This film was cut out into a square of 40 mm on one side. A plurality of 7-mm-diameter circles was uniformly hollowed to provide lost portions (openings; the reference numeral 9) and was subjected to processing such that the area proportion of the lost portions was about 12% (Table 1, No. 2) of the total area of the first electrode layer to obtain the first electrode layer 7, which was bonded to the inner side by 5 mm from each side of the dust collection layer. In addition, a copper foil tape (not shown) was pasted at corners and bonded to protrude from the dust collection layer.

As the second insulation layer 4 for insulating the first electrode layer 7 and the second electrode layer 8, a polyimide film having a total thickness of 0.075 mm of a base material obtained by laminating a polyimide adhesive tape (Teraoka Seisakusho co., Ltd., the name of product: 760H #25) having a base material thickness of 0.025 mm and two polyimide adhesive tapes (Okamoto Industries, Inc., the name of product: 1030E) into three layers was used.

As the second electrode layer 8, a film (DAINIHON PACKAGE CORPORATION, the name of product: DAICREA) having a thickness of 0.050 mm obtained by coating a PET base material with a conductive paint through use of a polythiophene-based conductive polymer at $10^4$ Ω was cut out into a square of 30 mm to obtain the second electrode layer 8, similarly to the above-described first electrode layer 7. This second electrode layer 8 had an area of 400 $mm^2$, which was smaller than the total area (900 $mm^2$) of the above-described first electrode layer 7 including the lost portions, and was arranged to be located on the inner side by 5 mm from each side of the first electrode layer 7. In addition, a copper foil tape (not shown) was pasted at corners and bonded to protrude from the dust collection layer.

As the third insulation layer 5 for insulating the second electrode layer 8 and the close-contact fixation layer 6, a polyimide adhesive tape (Teraoka Seisakusho co., Ltd., the name of product: 760H #25) having a base material thickness of 0.025 mm and a polyimide adhesive tape (Okamoto Industries, Inc., the name of product: 1030E) were overlapped and used.

As the close-contact fixation layer 6, a neodymium magnet sheet having a thickness of 0.6 mm (manufactured by Niroku seisakusho Co., Ltd., the name of product: RSN09) was used.

They were laminated to obtain the laminated sheet 1, which was cut out into a square of 50 mm on one side to be outside by 5 mm from each side of the first electrode layer 7.

A power supply device for applying voltages to this produced laminated sheet 1 was prepared as will be described below. First, a connector-equipped voltage-resistant cable (manufactured by NISSEI ELECTRIC CO., LTD., the name of product: RSU-DC10KV-22) was soldered to a copper foil tape (not shown). The copper foil tape was pasted to a copper foil tape (not shown) bonded to the above-described electrode corners and was subjected to insulation processing with an insulation tape. Next, the above-described connector portions were connected respectively to a first electrode layer as a negative electrode and a second electrode layer as a positive electrode of a power supply device [a power supply device including a direct-current high-voltage generation device, a power feeding cable, and a 100 VAC power supply] (not shown) to obtain an electric precipitator for test to be used in subsequent tests.

<Evaluation of Attractive Property of Electric Precipitator>

(1) Voltage Application and Evaluation of Attraction Distance

Figure 4:
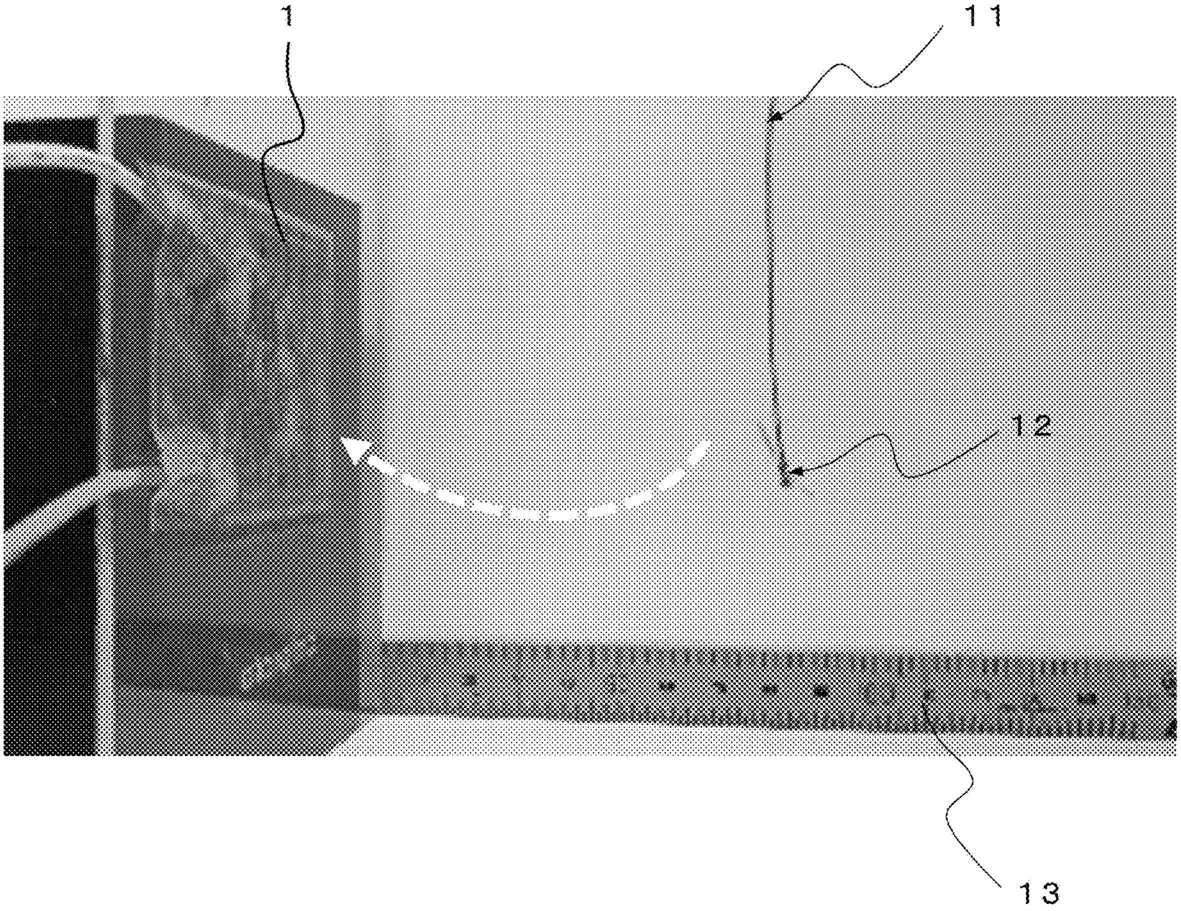
FIG. 4 is a photograph illustrating evaluations of an attraction property of an electric precipitator in an example, a blank arrow in the drawing showing a direction in which an aluminum piece 12 hung on a copper wire 11 is attracted to the electric precipitator.

As shown in FIG. 4, voltages as described in Table 3 were applied respectively to the first electrode layer and the second electrode layer of an electric precipitator erected such that the laminated sheet 1 portion is vertical to a floor surface.

Then, a sample with the aluminum piece 12 (approximately 10 mm×1 mm) hung using the copper wire 11 which was extremely thin at an interval (an attraction distance) on the dust collection layer 2 side of the electric precipitator was evaluated as to whether dust collection was performed by the electric precipitator. The attraction distance was visually measured using a metallic scale 13 installed at a lower part.

As a result, it was appreciated that the aluminum pieces were repelled when the voltages (a potential difference) in No. 1 to No. 4 were applied although being attracted to the dust collection layer, as shown in Table 3. On the other hand, in the cases of No. 5 to No. 6, the aluminum pieces were collected to the dust collection layer portion of the laminated sheet 1 and remained attracted.

TABLE 3

| Experiment No. | x (kV) | y (kV) | Potential difference (kV) | Attraction distance (mm) | Notes |
|---|---|---|---|---|---|
| 1 | 0 | −6 | 6 | 65 | Dust was repelled |
| 2 | 0 | −7 | 7 | 70 | Dust was repelled |
| 3 | 1 | −5 | 6 | 65 | Dust was repelled |
| 4 | 1 | −6 | 7 | 70 | Dust was repelled |
| 5 | 2 | −4 | 6 | 50 | Dust was collected |
| 6 | 2 | −5 | 7 | 60 | Dust was collected |

x: Voltage applied to second electrode layer
y: Voltage applied to first electrode layer (2) Evaluation of Dust Collection Effect in Press Mold A dust collection effect on an aluminum piece (having an indeterminate shape but having a rough diameter of approximately 0.1 mm to 2.0 mm) which was dusty foreign matter emitted when the above-described electric precipitator for test was installed in a press mold (a place in proximity to a material-cutting steel material in a lower die) and cutting was conducted using an aluminum material as a workpiece was evaluated. A schematic diagram is shown in FIG. 5.

REFERENCE SIGNS LIST

1 laminated sheet (electric precipitator), 2 dust collection layer, 3 first insulation layer, 4 second insulation layer, 5 third insulation layer, 6 close-contact fixation layer, 7 first electrode layer, 8 second electrode layer, 9 lost portion (opening), 10 mold, 11 copper wire, 12 aluminum piece, 13 scale

The invention claimed is:

1. An electric precipitator for a press mold, the electric precipitator being used together with the press mold to collect dusty foreign matter emitted during stamping process by an electrostatic force and comprising:

a laminated sheet in which a dust collection layer that holds the dusty foreign matter in contact, a first electrode layer, a second electrode layer, an insulation layer, and a close-contact fixation layer for installation on and fixation to a mold to be used are laminated; and a power supply device that applies voltages across the first and second electrode layers, wherein the insulation layer at least has a first insulation layer that insulates the dust collection layer and the first electrode layer, a second insulation layer that insulates the first electrode layer and the second electrode layer, and a third insulation layer that insulates the second electrode layer and the close-contact fixation layer, the first and second electrode layers are films obtained by coating a polyethylene terephthalate (PET) base material with a conductive polymer and having a surface resistivity of $10^4$ to $10^5$ Ω, and a polyimide film having a base material thickness of 75 μm is used for the second insulation layer.

2. The electric precipitator for a press mold according to claim 1, wherein the first electrode layer has a plurality of lost portions extending through in a thickness direction of the first electrode layer, the lost portions have an area ratio of 10% to 20% of a total area of the first electrode layer, and the first electrode layer including the lost portions is larger in top view than the second electrode layer by 4.2 to 6.2 mm at an end, and the first and second electrode layers are laminated with an interposition of the second insulation layer in a thickness direction of the laminated sheet.

3. The electric precipitator for a press mold according to claim 1, wherein during use, the electric precipitator is used with a negative voltage applied to the first electrode layer and a positive voltage applied to the second electrode layer, and the voltage applied to the first electrode layer is 4 to 5 kilovolts (kV), and the voltage applied to the second electrode layer is 2 kilovolts (kV).

4. The electric precipitator for a press mold according to claim 1, wherein the close-contact fixation layer includes a neodymium magnet sheet.

5. The electric precipitator for a press mold according to claim 1, wherein a silicone resin sheet is used for the dust collection layer.

6. A press mold, wherein the electric precipitator for a press mold according to claim 1 is used.

* * * * *